June 13, 1950 R. RUEMELIN 2,511,445
AUTOMATIC BELT TENSIONING DEVICE
Filed Jan. 8, 1949 2 Sheets-Sheet 1

INVENTOR.
Richard Ruemelin
BY
Morsell & Morsell
ATTORNEYS.

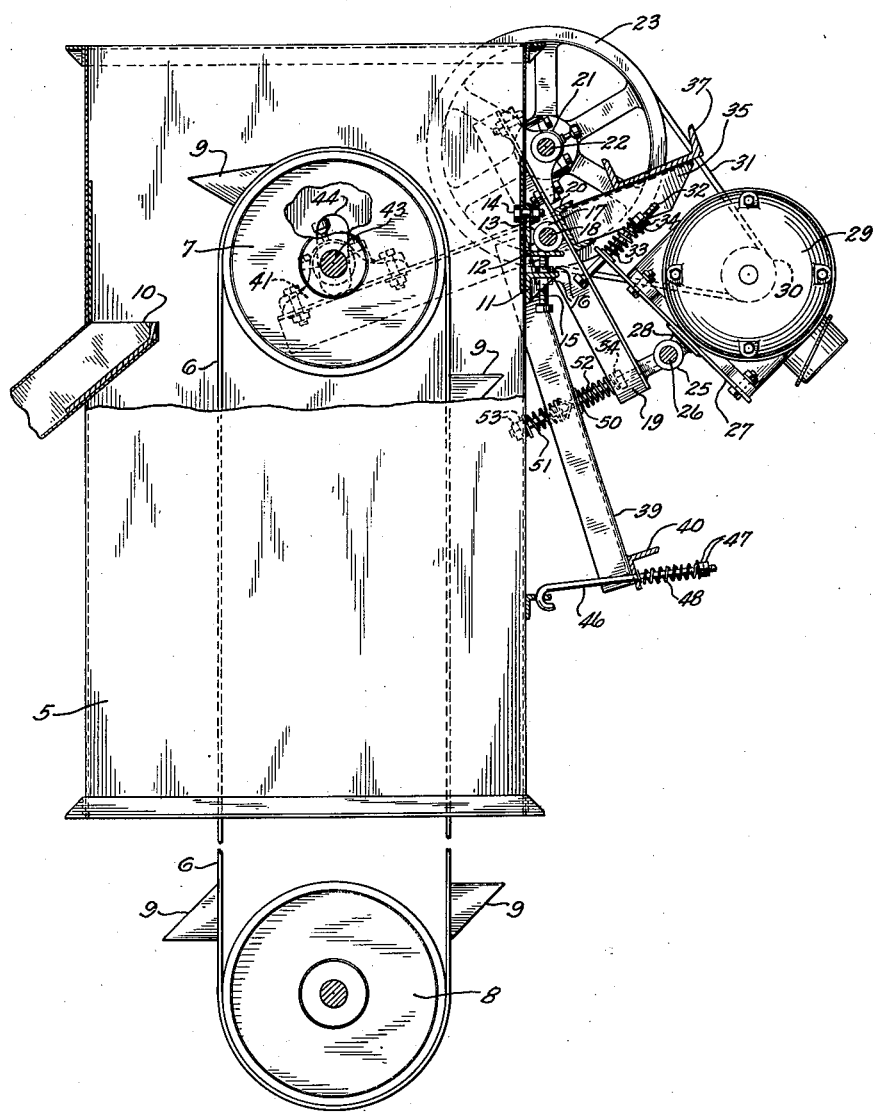

Patented June 13, 1950

2,511,445

UNITED STATES PATENT OFFICE 2,511,445

AUTOMATIC BELT TENSIONING DEVICE

Richard Ruemelin, Milwaukee, Wis.

Application January 8, 1949, Serial No. 69,945

20 Claims. (Cl. 74—242.8)

This invention relates to improvements in automatic belt tensioning devices and more particularly but not exclusively to devices for automatically and simultaneously tensioning endless conveyor belts and transmission belts for driving the same.

Heretofore, in order to prevent slippage between driving pulleys and belts driven thereby various belt tensioning devices have been utilized. These have taken the form of idler pulleys, adjustable pulley shaft bearings and the like, which either require adjustment from time to time, or which require the use of mechanism in addition to that which is a basic part of the belt drive system itself.

It is therefore a general object of the invention to provide pulley and motor mounting means for automatically maintaining belts connected thereto sufficiently taut to prevent slippage.

A further object of the invention is to provide in a motor driven pulley and belt system means for mounting the motor and said pulleys in such a manner that the weight of said motor at all times maintains all of the belts in the system in taut condition on the pulleys.

A further object of the invention is to provide a motor driven speed reducing belt-drive transmission for driving an endless belt conveyor wherein there is novel pulley shaft and motor mounting means and wherein the endless belt conveyor as well as each of the belts in the transmission is automatically maintained in taut condition.

A further object of the invention is to provide an apparatus of the class described which is strong and durable, which, after the initial installation adjustments, requires no further attention, which is relatively easy to manufacture, and which is otherwise well adapted for the purposes described.

With the above and other objects in view, the invention consists of the improved belt tensioning apparatus, and all of its parts and combinations, as set forth in the claims, and all equivalents thereof.

Referring more particularly to the drawings accompanying and forming a part of this specification, wherein is shown one complete embodiment of the preferred form of the invention, and wherein the same reference characters indicate the same parts in all of the views:

Fig. 1 is a perspective view of the improved apparatus;

Fig. 2 is a side view of the improved apparatus, parts being broken away and shown in section; and Fig. 3 is a fragmentary side view of the improved apparatus with the exterior pulley removed from the elevator belt drive shaft.

Referring more particularly to the drawings, the numeral 5 indicates a housing for the upper end of an elevator type belt conveyor. The housing 5 is preferably rectangular in cross section and made of sheet metal or other suitable material. The numeral 6 indicates an endless conveyor belt within the housing 5 which circumscribes an upper pulley 7 and a lower pulley 8. The upper pulley 7 is mounted in a manner hereinafter to be described, and the lower pulley 8 is usually mounted for rotation about a fixed axis spaced below the upper pulley 7.

Fixed to the outer surface of the conveyor belt 6 are spaced buckets 9 of any suitable type, and projecting through one end wall of the housing 5 may be a discharge chute 10. In operation, the pulleys 7 and 8 rotate in a counterclockwise direction as viewed in Fig. 2, and the conveyor belt 6 with the buckets 9 is adapted to receive material adjacent the lower pulley 8 and to discharge this material into the chute 10 spaced thereabove.

Fixed to and extending horizontally across the end wall of the housing 5 opposite the discharge chute 10 is an angle member 11 having its upper surface extending in a horizontal plane. Adjustably positioned on the same end wall above the angle member 11, and having its lower surface extending in a horizontal plane is an angle member 12. The member 12 is formed with vertically extending slots 13 (see Fig. 2) through which extend bolts 14 to provide means for vertically adjusting the position of the angle member 12. Extending vertically through the angle member 11, and having its upper end in contact with the lower surface of the angle member 12, are adjustment bolts 15, there being a lock nut 16 positioned above and another lock nut 16 positioned below the portion of the angle member 11 through which the bolt 15 extends.

Fixed, as by welding, to opposite end portions of the angle member 12 are suitable bearings 17. Rotatably mounted in the bearings 17 is a horizontally extending shaft 18. A pair of substantially identical angle members 19 are held in spaced parallel relationship by a transverse channel member 20 (see Fig. 2) fixed thereto, as by welding, intermediate their length. The angle members 19 are apertured intermediate their length to receive end portions of the shaft 18, about which said members are susceptible of pivotal movement. As shown in Figs. 1 and 2, the angle members 19 are positioned outwardly of opposite side portions of the housing 5.

Mounted preferably adjacent the upper ends of the angle members 19 are suitable bearings 21 which rotatably carry a horizontally extending shaft 22. Fixed to opposite outer ends of the shaft 22 are a relatively large V-belt pulley 23 and a relatively small V-belt pulley 24 (see Fig. 1), each of which is preferably adapted to accommodate two or more V-belts.

Fixed to the ends of the angle members 19 opposite the bearings 21 are bearings 25 which carry a horizontally extending shaft 26. The bearings 25 preferably hold the shaft 26 spaced from the surface of the angle members 19 to which said bearings are fixed. A mounting plate 27 has formed on its underside a bearing 28 pivotally connecting it with the shaft 26, and an electric motor 29 is fixed to the mounting plate 27.

The motor 29 is provided with a suitable driving pulley 30 (see Fig. 2) which is adapted to accommodate two or more V-belts. A suitable number of V-belts 31 connect the pulleys 23 and 30. Extending through one of the angle members 19 and through an upper end portion of the mounting plate 27 is a bolt 32. The bolt 32 has positioned therearound, above the plate 27, a helical spring 33 which is maintained in suitably adjusted position by nuts 34.

Mounted intermediate their length on the outer ends of the shaft 18 and outwardly of the angle members 19 are parallel angle members 35 and 36. The members 35 and 36 are fixed to the shaft 18 and may be connected at their outer ends by a channel member 37 welded thereto. Fixed to and projecting downwardly from the angle members 35 and 36 at substantially a right angle therefrom and from corresponding points adjacent the shaft 18 are angle members 38 and 39. The lower ends of the angle members 38 and 39 may be fixedly connected by a transverse angle member 40 welded thereto.

The angle members 35 and 36 extend substantially parallel with and outwardly of opposite side walls of the housing 5. Carried at the inner ends of the angle members 35 and 36 are suitable bearings 41 and 42 in which is rotatably supported a shaft 43. The shaft 43 extends through the side walls of the housing 5, said walls being slotted, as at 44 and 45 (see Figs. 2 and 3), to permit vertical swinging movement of the shaft 43 about the shaft 18 as the angle members 35 and 36 pivot thereon. Fixed to the shaft 43 within the housing 5 is the upper conveyor belt pulley 7.

Pivotally connected to the end wall of the housing 5 opposite the delivery chute 10, at a point adjacent the lower end of the angle members 38 and 39, is a bolt 46 which extends substantially horizontally outwardly and projects through the angle member 40. The bolt 46 is provided with suitable lock nuts 47 which hold a suitable helical spring 48, positioned between the angle member 40 and said lock nuts, in properly adjusted position on the bolt 46.

Pivotally connected to the outer ends of the motor supporting shaft 26, and projecting toward and through suitable apertures in the angle members 38 and 39, are suitable eye-bolts 49 and 50. Surrounding the eye bolts 49 and 50 above and below the angle members 38 and 39 are helical springs 51 and 52 which are held in properly adjusted position by lock nuts 53 and 54.

Fixed to the near end of the shaft 43 as viewed in Fig. 1, is a relatively large V-belt pulley 55, and connecting the pulley 55 with the pulley 24, are preferably three V-belts 56.

In operation, the electric motor 29 drives the pulley 30 at a relatively high speed. By means of the belts 31 and 56 and the intermediate pulleys 23 and 24, the large pulley 55 is driven at a relatively slow speed. The weight of the motor 29 urges said motor downwardly and tends to cause said motor to swing in a clockwise direction about the shaft 26 as viewed in Figs. 1 and 2. This subjects the belt 31 to continuous tensile stresses which maintain said belt in taut condition. If the weight of the motor 29 is too great, the tensile stresses on the belt 31 may be reduced by adjusting the lock nuts 34 on the bolt 32 so that the spring 33 exerts a force on the mounting plate 37 tending to cause counterclockwise movement of said plate about the shaft 26.

The weight of the motor 29 also tends to cause clockwise pivotal rotation of the angle members 19 on the shaft 18. This force exerted by the motor causes tensile stresses to be continually exerted on the V-belts 56, thereby maintaining said belts in taut condition. The weight of the motor 29, acting through the eye bolts 49 and 50 and the helical springs 52, exerts a force on the angle members 38 and 39 tending to pivot the angle members 35 and 36 on the shaft 18 in a clockwise direction. The weight of the motor also acts through the angle members 19, the shaft 22, the pulley 24, the belts 56, and the pulley 55 to tend to cause clockwise rotation of the angle members 35 and 36 about the shaft 18. An additional force tending to rotate the angle members 35 and 36 in a clockwise direction on the shaft 18 is transmitted through the belts 31 and pulley 23 to the shaft 22, and the latter, in turn, transmits this force to the pulley 24, belts 56, and pulley 55.

Acting in the manner above described, the weight of the motor 29 therefore causes the inner ends of the angle members 35 and 36 to swing upwardly, to carry with them the upper conveyor pulley 7. The pulley 7 is thereby urged into frictional driving engagement with the conveyor belt 6 and serves to maintain the conveyor belt in taut condition at all times. If, for any reason, the weight of the motor 29 should be insufficient to maintain the proper frictional engagement between the pulley 7 and the conveyor belt 6, adjustment of the lock nuts 47 on the bolt 46 will cause the helical spring 48 to exert an inward force on the angle member 40 which will tend to cause clockwise rotation of the angle members 35 and 36 on the shaft 18. This force augments the conveyor belt tightening force exerted by the weight of the motor 29.

It is apparent from the above that the invention provides a simple means for automatically maintaining the driving belts as well as the conveyor belt in a proper condition of tension at all times, thereby insuring maximum efficiency without requiring periodic adjustments.

The term "belt" as used in the claims contemplates any elongated power transmitting member.

Various changes and modifications and other adaptations may be made without departing from the spirit of the invention, and all of such changes are contemplated, as may come within the scope of the claims.

What I claim is:

1. In a belt tensioning device, a lever pivotally supported intermediate its length; a motor pivotally mounted on said lever at one side of the pivotal support for said lever, said motor having a driving pulley; a shaft journalled on said lever on the other side of the pivotal support for the lever; a first intermediate pulley fixed to said shaft; a second intermediate pulley fixed to said shaft; a second lever pivotally mounted adjacent said first lever, the mounting for said second lever having the same pivot axis as that of the first lever; a driven pulley on said second lever; a first belt connecting said driving pulley with the first intermediate pulley; and a second belt connecting the second intermediate pulley with said driven pulley, said motor being disposed at such an angle that its weight causes said motor to tend to swing on its pivotal mounting away from said intermediate pulleys to thereby maintain said first belt in taut condition, and said first lever being disposed at such an angle that the weight of the motor urges said first lever to swing about its pivotal support in a direction to cause movement of said intermediate pulleys away from the driven pulley to thereby maintain the second belt in taut condition.

2. In a belt tensioning device, a lever pivotally supported intermediate its length; a motor pivotally connected to said lever on one side of the pivotal support for said lever and swingable relative to said lever; a driving pulley on said motor; a shaft journalled on said lever on the other side of the pivotal support for said lever; a first intermediate pulley fixed to said shaft; a second intermediate pulley fixed to said shaft; a driven pulley; a first belt connecting said driving pulley with the first intermediate pulley; and a second belt connecting the second intermediate pulley with said driven pulley; said motor being disposed at such an angle that its weight causes said motor to tend to swing on its pivotal mounting away from said intermediate pulleys to thereby maintain said first belt in taut condition; and resilient means for urging said motor in the opposite direction about said pivotal connection, said lever being disposed at such an angle that the weight of the motor urges said lever to swing about its pivotal support in a direction to cause movement of said intermediate pulleys away from the driven pulley to thereby maintain the second belt in taut condition.

3. In a belt tensioning device, a lever pivotally supported intermediate its length for movement in a vertical plane; a motor pivotally connected to said lever for swinging movement in a vertical plane on one side of the pivotal support for said lever and swingable relative to said lever; a driving pulley on said motor rotatable on a horizontal axis; a horizontally extending shaft journalled on said lever on the other side of the pivotal support for said lever; a first intermediate pulley fixed to said shaft; a second intermediate pulley fixed to said shaft; a driven pulley rotatable on a horizontal axis; a first belt connecting said driving pulley with the first intermediate pulley; and a second belt connecting the second intermediate pulley with said driven pulley; said motor being disposed at such an angle that its weight causes said motor to tend to swing on said pivotal connection away from said intermediate pulleys to thereby maintain said first belt in taut condition; and resilient means for urging said motor in the opposite direction about said pivotal connection; said lever being disposed at such an angle that the weight of the motor urges said lever about its pivotal support in a direction to cause movement of said intermediate pulleys away from the driven pulley to thereby maintain the second belt in taut condition.

4. In a belt tensioning device, a first lever pivotally mounted intermediate its length; a shaft journalled on said lever on one side of the pivotal mounting for said lever; a pair of driven pulleys fixed to said shaft; an arm fixed to and projecting at an angle from said lever; a second lever pivotally mounted intermediate its length; at least one intermediate pulley journalled on said second lever on one side of the pivotal mounting for said second lever; a motor pivotally mounted on said second lever on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; and means connecting the second lever with the projecting arm of said first lever, said motor being disposed at such an angle that its weight causes said motor to tend to swing on its pivotal mounting away from said intermediate pulley to thereby maintain said first belt in taut condition, said second lever being disposed at such an angle that the weight of the motor urges said second lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction.

5. In a belt tensioning device, a first lever pivotally mounted intermediate its length; a shaft journalled on said lever on one side of the pivotal mounting for said lever; a pair of driven pulleys fixed to said shaft; an arm fixed to and projecting at an angle from said lever; a second lever pivotally mounted intermediate its length; at least one intermediate pulley journalled on said second lever on one side of the pivotal mounting for said second lever; a motor pivotally mounted on said second lever on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; and means resiliently connecting the second lever with the projecting arm of said first lever, said motor being disposed at such an angle that its weight causes said motor to tend to swing on its pivotal mounting away from said intermediate pulley to thereby maintain said first belt in taut condition, said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction.

6. In a belt tensioning device, a first lever pivotally mounted intermediate its length for movement in a vertical plane; a shaft journalled on said lever on one side of the pivotal mounting for said lever; a pair of driven pulleys fixed to said shaft; an arm fixed to and projecting at an angle from said lever; a second lever pivotally mounted intermediate its length for movement in a vertical plane; at least one intermediate pulley journalled on said second lever on one side of the pivotal mounting for said second lever; a motor pivotally mounted on said second lever for vertical swinging movement on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys, and means connecting the second lever with the projecting arm of said first lever, said motor being disposed at such an angle that its weight causes said motor to tend to swing on its pivotal mounting away from said intermediate pulley to thereby maintain said first belt in taut condition, said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction.

7. In a belt tensioning device, a first lever pivotally mounted intermediate its length for movement in a vertical plane; a shaft journalled on said lever on one side of the pivotal mounting for said lever; a pair of driven pulleys fixed to said shaft; an arm fixed to and projecting at an angle from said lever; a second lever pivotally mounted intermediate its length for movement coaxially with said first lever; at least one intermediate pulley journalled on said second lever on one side of the pivotal mounting for said second lever; a motor pivotally mounted on said second lever on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; and means connecting the second lever with the projecting arm of said first lever, said motor being disposed at such an angle that its weight causes said motor to tend to swing on its pivotal mounting away from said intermediate pulley to thereby maintain said first belt in taut condition, said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction.

8. In a belt tensioning device, a first lever pivotally mounted intermediate its length; a shaft journalled on said lever on one side of the pivotal mounting of said lever; a pair of driven pulleys fixed to said shaft; an arm fixed to and projecting at an angle from said lever; a second lever pivotally mounted intermediate its length; at least one intermediate pulley journalled on said second lever on one side of the pivotal mounting for said second lever; a motor pivotally mounted on said second lever on the other side of the pivotal mounting for said second lever; said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means connecting the second lever with the projecting arm of said first lever; said motor being disposed at such an angle that its weight causes said motor to tend to swing on its pivotal mounting away from said intermediate pulley to thereby maintain said first belt in taut condition, and resilient means for urging said motor in the opposite direction about its pivotal mounting; said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction.

9. In a belt tensioning device, a first lever pivotally mounted intermediate its length; a shaft journalled on said lever on one side of the pivotal mounting for said lever; a pair of driven pulleys fixed to said shaft; an arm fixed to and projecting at an angle from said lever; a second lever pivotally mounted intermediate its length; at least one intermediate pulley journalled on said second lever on one side of the pivotal mounting for said second lever; a motor pivotally mounted on said second lever on the other side of the pivotal mounting for said second lever; said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means connecting the second lever with the projecting arm of said first lever; said motor being disposed at such an angle that its weight causes said motor to tend to swing on its pivotal mounting away from said intermediate pulley to thereby maintain said first belt in taut condition, said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction; and resilient means connected to the arm of said first lever for urging said lever in a conveyor belt tightening direction.

10. In a belt tensioning device, a first lever pivotally mounted intermediate its length for movement in a vertical plane; a shaft journalled on said lever on one side of the pivotal mounting of said lever; a pair of driven pulleys fixed to said shaft; an arm fixed to and projecting at an angle from said lever; a second lever pivotally mounted intermediate its length for movement in a vertical plane; at least one intermediate pulley journalled on said second lever on one side of the pivotal mounting for said second lever; a motor pivotally mounted for vertical swinging movement on said second lever on the other side of the pivotal mounting for said second lever; said motor having a driving pulley; a first belt connecting said driving pulley with an intermediate pulley; a second belt connecting an intermediate pulley with one of said driven pulleys; an endless conveyor belt circumscribing and driven by the other of said driven pulleys; and means resiliently connecting the second lever with the projecting arm of said first lever, said motor being disposed at such an angle that its weight causes said motor to tend to swing on its pivotal mounting away from said intermediate pulley to thereby maintain said first belt in taut condition, said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction.

11. In a belt tensioning device, a first lever pivotally mounted intermediate its length for movement in a vertical plane; a shaft journalled on said lever on one side of the pivotal mounting of said lever; a pair of driven pulleys fixed to said shaft; an arm fixed to and projecting at an angle from said lever; a second lever pivotally mounted intermediate its length for movement in a vertical plane; at least one intermediate pulley journalled on said second lever on one side of the pivotal mounting for said second lever; a motor pivotally mounted on said second lever for vertical swinging movement at the other side of the pivotal mounting for said second lever; said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means connecting the second lever with the projecting arm of said first lever, said motor being disposed at such an angle that its weight causes said motor to tend to swing on its pivotal mounting away from said intermediate pulleys to thereby maintain said first belt in taut condition, said second lever being disposed at such an angle that the weight of the motor urges said lever about its pivotal mounting in a direction to cause said intermediate pulley to tend to move away from said driven pulleys to thereby maintain the second belt in taut condition; and resilient means for urging said motor in the opposite direction about its pivotal mounting; said first lever being disposed at such an angle that the weight of the motor acting through the connection between the second lever and the arm of the first lever urges said first lever about its pivotal mounting in a direction to urge the driven pulleys in a conveyor belt tightening direction.

12. In a belt tensioning device, a first lever pivotally mounted intermediate its length for movement in a vertical plane; a shaft journalled on said lever on one side of the pivotal mounting for said lever; a pair of driven pulleys fixed to said shaft; an arm fixed to and projecting at an angle from said lever; a second lever pivotally mounted intermediate its length for movement in a vertical plane; at least one intermediate pulley journalled on said second lever on one side of the pivotal mounting for said second lever; a motor pivotally mounted on said second lever for vertical swinging movement on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means connecting the second lever with the projecting arm of said first lever, said motor being disposed at such an angle that its weight causes said motor to tend to swing on its pivotal mounting away from said intermediate pulleys to thereby maintain said first belt in taut condition, said second lever being disposed at such an angle that the weight of the motor urges said lever about its pivotal mounting in a direction to cause said intermediate pulley to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction; and resilient means connected to the arm of said first lever for urging said lever in a conveyor belt tightening direction.

13. In a belt tensioning device, a first lever pivotally mounted intermediate its length; a shaft journalled on said lever on one side of the pivotal mounting for said lever; a pair of driven pulleys fixed to said shaft; an arm fixed to and projecting at an angle from said lever; a second lever pivotally mounted intermediate its length; at least one intermediate pulley journalled on said second lever on one side of the pivotal mounting for said second lever; a motor pivotally mounted on said second lever at the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means resiliently connecting the second lever with the projecting arm of said first lever, said motor being disposed at such an angle that its weight causes said motor to tend to swing on its pivotal mounting away from said intermediate pulley to thereby maintain said first belt in taut condition; resilient means for urging said motor in the opposite direction about its pivotal mounting; said second lever being disposed at such an angle that the weight of the motor urges said lever about its pivotal mounting in a direction to cause said intermediate pulley to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction; and resilient means connected to the arm of said first lever for urging said lever in a conveyor belt tightening direction.

14. In a belt tensioning device, a first lever pivotally mounted intermediate its length for movement in a vertical plane; a shaft journalled on said lever at one side of the pivotal mounting for said lever; a pair of driven pulleys fixed to said shaft; an arm fixed to and projecting at an angle from said lever; a second lever pivotally mounted intermediate its length for movement in a vertical plane; at least one intermediate pulley journalled on said second lever on one side of the pivotal mounting for said second lever; a motor pivotally mounted on said second lever for vertical swinging movement on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means resiliently connecting the second lever with the projecting arm of said first lever, said motor being disposed at such an angle that its weight causes said motor to tend to swing on its pivotal mounting away from said intermediate pulley to thereby maintain said first belt in taut condition; resilient means for urging said motor in the opposite direction about its pivotal mounting; said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction; and resilient means connected to the arm of said first lever for urging said lever in a conveyor belt tightening direction.

15. In a belt tensioning device, a first lever pivotally mounted intermediate its length for movement in a vertical plane; a shaft journalled on said lever at one side of the pivotal mounting for said lever; a pair of driven pulleys fixed to said shaft; an arm fixed to and projecting at an angle from said lever; a second lever pivotally mounted intermediate its length for movement coaxially with said first lever; at least one intermediate pulley journalled on said second lever on one side of the pivotal mounting for said second lever; a motor pivotally mounted on said second lever for vertical swinging movement on the other side of the pivotal mounting for said second lever, said motor having a driving pulley; a first belt connecting said driving pulley with an intermediate pulley; a second belt connecting an intermediate pulley with one of said driven pulleys; an endless conveyor belt circumscribing and driven by the other of said driven pulleys; means resiliently connecting the second lever with the projecting arm of said first lever, said motor being disposed at such an angle that its weight causes said motor to tend to swing on its pivotal mounting away from said intermediate pulleys to thereby maintain said first belt in taut condition; resilient means for urging said motor in the opposite direction about its pivotal mounting; said second lever being disposed at such an angle that the weight of the motor urges said lever about its pivotal mounting in a direction to cause said intermediate pulleys to tend to move away from said driven pulleys to thereby maintain the second belt in taut condition, and said first lever being disposed at such an angle that the weight of the motor acting through the connection between the second lever and the arm of the first lever urges said first lever about its pivotal mounting in a direction to urge the driven pulleys in a conveyor belt tightening direction; and resilient means connected to the arm of said first lever for urging said lever in a conveyor belt tightening direction.

16. In a belt tensioning device, a first lever pivotally supported intermediate its length; a motor pivotally mounted on said lever at one side of the pivotal support for said lever, said motor having a driving pulley; a shaft journalled on said lever on the other side of the pivotal support for the lever; a first intermediate pulley fixed to said shaft; a second intermediate pulley fixed to said shaft; a second lever pivotally mounted adjacent said first lever, the mounting for said second lever having the same pivot axis as that of the first lever; a driven pulley on said second lever; an adjustable connection between said first and second levers for limiting the range of relative pivotal movement therebetween; a first belt connecting said driving pulley with the first intermediate pulley; and a second belt connecting the second intermediate pulley with said driven pulley, said motor being disposed at such an angle that its weight causes said motor to tend to swing on its pivotal mounting away from said intermediate pulleys to thereby maintain said first belt in taut condition, and said first lever being disposed at such an angle that the weight of the motor urges said first lever to swing about its pivotal support in a direction to cause movement of said intermediate pulleys away from the driven pulley to thereby maintain the second belt in taut condition.

17. In a belt tensioning device; a horizontally extending shaft; a first lever pivotally mounted on said shaft intermediate its length; a second lever pivotally mounted on said shaft; a motor pivotally mounted on said first lever at one side of said shaft; a driving pulley on said motor; a second shaft journalled on said first lever on the other side of said shaft; a first intermediate pulley fixed to said second shaft; a second intermediate pulley fixed to said second shaft; a driven pulley rotatably mounted on said second lever and spaced from said first shaft; a first belt connecting said driving pulley with the first intermediate pulley; and a second belt connecting the second intermediate pulley with said driven pulley, said motor being disposed at such an angle that its weight causes said motor to tend to swing on its pivotal mounting away from said intermediate pulleys to thereby maintain said first belt in taut condition, and said levers being disposed at such an angle that the weight of the motor urges said first lever to swing about its pivotal support in a direction to cause movement of said intermediate pulleys away from the driven pulley to thereby maintain the second belt in taut condition.

18. In a belt tensioning device: a horizontally extending shaft; a first lever pivotally mounted on said shaft intermediate its length; a second lever pivotally mounted on said shaft; a motor pivotally mounted on said first lever at one side of said shaft; a driving pulley on said motor; a second shaft journalled on said first lever on the other side of said shaft; a first intermediate pulley fixed to said second shaft; a second intermediate pulley fixed to said second shaft; a third shaft journalled on said second lever and spaced from said first shaft; a pair of driven pulleys fixed to said third shaft; a first belt connecting said driving pulley with the first intermediate pulley; a second belt connecting the second intermediate pulley with one of said driven pulleys; and an endless conveyor belt circumscribing and driven by the other of said driven pulleys, said motor being disposed at such an angle that its weight causes said motor to tend to swing on its pivotal mounting away from said intermediate pulleys to thereby maintain said first belt in taut condition, and said levers being disposed at such an angle that the weight of the motor urges said first lever to swing about its pivotal support in a direction to cause movement of said intermediate pulleys away from the driven pulleys to thereby maintain the second belt and the conveyor belt in taut condition.

19. In a belt tensioning device: a horizontally extending shaft; a first lever pivotally mounted on said shaft intermediate its length; a second lever pivotally mounted on said shaft; a motor pivotally mounted on said first lever at one side of said shaft; a driving pulley on said motor; a second shaft journalled on said first lever on the other side of said shaft; a first intermediate pulley fixed to said second shaft; a second intermediate pulley fixed to said second shaft; a driven pulley rotatably mounted on said second lever and spaced from said first shaft; a first belt connecting said driving pulley with the first intermediate pulley; a second belt connecting the second intermediate pulley with said driven pulley; a resilient connection between said first and second levers for limiting the range of relative pivotal movement therebetween, said motor being disposed at such an angle that its weight causes said motor to tend to swing on its pivotal mounting away from said intermediate pulleys to thereby maintain said first belt in taut condition, and said levers being disposed at such an angle that the weight of the motor urges said first lever to swing about its pivotal support in a direction to cause movement of said intermediate pulleys away from the driven pulley to thereby maintain the second belt in taut condition.

20. In a belt tensioning device: a first pivotally supported lever extending in a lateral direction; a second lever pivotally mounted adjacent said first lever, the mounting for said second lever having the same pivot axis as that of the first lever, said second lever extending in an up and down direction transverse to said first lever; a motor pivotally mounted on said second lever below said first lever; a driving pulley on said motor; a shaft journalled on said second lever on the opposite side of said pivot axis from said motor; a first intermediate pulley fixed to said shaft; a second intermediate pulley fixed to said shaft; a driven pulley rotatably mounted on said first lever; a first belt connecting said driving pulley with the first intermediate pulley and a second belt connecting the second intermediate pulley with said driven pulley, said motor being disposed at such an angle that its weight causes said motor to tend to swing on its pivotal mounting away from said intermediate pulleys to thereby maintain said first belt in taut condition, and the angular disposition of said levers being such that the weight of the motor urges said second lever to swing about its pivotal support in a direction to cause movement of the intermediate pulleys away from the driven pulley to thereby maintain the second belt in taut condition.

RICHARD RUEMELIN.

REFERENCES CITED

The following references are of record in the file of this patent:

UNITED STATES PATENTS

| Number | Name | Date |
|---|---|---|
| 2,165,754 | Hornack | July 11, 1939 |
| 2,372,342 | Smith et al. | Mar. 27, 1945 |